UNITED STATES PATENT OFFICE.

WALTER D. FIELD, OF SPRINGFIELD, NEW JERSEY.

VARNISH.

SPECIFICATION forming part of Letters Patent No. 434,330, dated August 12, 1890.

Application filed November 30, 1888. Renewed March 4, 1890. Serial No. 342,646. (No specimens.)

*To all whom it may concern:*

Be it known that I, WALTER D. FIELD, a citizen of the United States, residing at Springfield, in the county of Union and State of New Jersey, have invented certain new and useful Improvements in Varnishes; and I do hereby declare the following to be a full, clear, and exact description of the invention, such as will enable others skilled in the art to which it appertains to make and use the same.

It is well known that heretofore varnishes for use on wood and other surfaces have been made from different resins or gum-resins—such as copal, sandarac, and shellac—dissolved in oil, and commonly known as "oil-varnishes," or dissolved in alcohol or other volatile solvents and commonly known as "spirit-varnishes."

The difficulties experienced in the use of oil-varnishes are that, while they form more or less cohesive varnish-films, they are slow-drying, thus consuming much time in their application, lack hardness, and have a tendency after a time to crack, lose their brilliancy, and discolor, and are injuriously affected by exposure.

The difficulties experienced in the use of spirit-varnishes are even greater, for while the spirit-varnishes are, as a rule, quicker drying and harder than the oil-varnishes, the volatile menstrua, in which the resins or gum-resins forming their base are dissolved, do not impart good flowing qualities, nor the tough and cohesive film of the oil-varnish, and the solvent in the spirit-varnish, from its greater solvent power, acts on the under coats more quickly than the oil and impairs their brilliancy, thus rendering it difficult to apply repeated coats and obtain their full effect.

It has been the object of my experiment to produce a resin or gum-resin spirit-varnish which should form a film having the hardness, transparency, and quick-drying qualities of the film in a spirit-resin or gum-resin varnish, combined with the cohesiveness, elasticity, and toughness of the film in an oil-varnish, without the defects of either.

It is well known that the presence of oil in oil-varnishes contributes the qualities of cohesiveness, elasticity, and toughness to the film, and that as the oil slowly oxidizes the film loses those qualities and becomes brittle and cracked, and frequently discolors. I therefore endeavor to find some substance which could be introduced into a spirit-resin or gum-resin varnish and would contribute the cohesiveness, elasticity, and toughness of the oil in an oil-varnish, and would, unlike the oil, remain permanently unchanged in the varnish-film.

I have discovered after a long series of experiments that if pyroxyline or soluble nitro-cellulose be introduced in proper proportions into a spirit-resin or gum-resin varnish it renders the film cohesive, tough, and elastic, and remaining chemically unchanged in the film. After the volatilization of the solvents used the film retains its cohesiveness, toughness, and elasticity, and remains unaffected by the atmosphere. I have discovered, also, that the presence of pyroxyline in the varnish causes the formation of a film which, like the film of an oil-varish, is not when thoroughly dry easily dissolved by subsequent coats, and thus a number of coats of varnish may be applied to the surface with very little loss of brilliancy, and that any action of the upper on the under coats may be further prevented by using solutions having very little free solvent—that is, practically saturated.

In practicing my invention I first dissolve the resin or gum-resin and pyroxyline forming the base of the varnish in any volatile solvent of both bases in any proportions, from one part, by weight, of pyroxyline to three parts of resin or gum-resin up to equal parts, by weight, of the pyroxyline to the resin or gum-resin, and then thoroughly stir or otherwise agitate the mixture, and permit the solution to stand until thoroughly cleared by settling, when it is ready for application to the surface to be varnished; but in practice I prefer to use one part, by weight, of pyroxyline to two parts, by weight, of the resin or gum-resin, as this has given the best results.

The following formula has been found to work well in practice and produce an excellent varnish-film, especially suitable for outdoor work and for work exposed to salt-water: Amyl-acetate, fifty gallons; spirits of turpentine, twenty-five gallons; methyl-alcohol, twenty-five gallons; pyroxyline, thirty-seven and one-half pounds; shellac, thirty-seven and one-half pounds. In this formula ethyl, methyl, propyl, or butyl acetates or mixtures of them may be substituted for amyl-acetate, and cedar and other similar essential oils may be substituted for spirits of turpentine; or the spirits of turpentine may be omitted entirely and the amyl-acetate increased in proportion; also, rosin or copal or sandarac resins or gum-resins may be substituted for shellac; but I prefer to use clear shellac clarified by the process described in my application of even date herewith, as working better with the pyroxyline and producing a tougher, more transparent and better varnish for most purposes.

Of course the composition of this varnish may be varied by increasing the thickness, by increasing the proportion of base, or diminishing the thickness by increasing the solvent; but in practice I prefer to use practically saturated solutions, as they are less liable to attack the under coats. I may also add to the varnish from five to ten per cent. of linseed or other fixed oil, which for some purposes improves its spreading qualities.

The term "resins and gum-resins" in this specification is not intended to cover balsams.

I am aware that resins or gum-resins have been introduced into pyroxyline varnishes, but only in comparatively small quantities, and not to such an extent as to materially modify the peculiar character of the pyroxyline, whereas in my discovery I form the body of my varnish of the gum or gum-resins and introduce pyroxyline in comparatively limited quantities for the purpose of adding to the more substantial body-giving qualities of resin or gum-resin varnishes the additional quality of a cohesiveness of film. I am thus enabled to produce a heavy, substantial, cohesive, and durable film, which is not only serviceable as a protection to wood and other substances, but is capable of a great variety of applications.

I therefore claim as new and desire to secure by Letters Patent—

1. A varnish adapted to produce a tough, elastic, and cohesive film, containing pyroxyline or soluble nitro-cellulose, combined with resins or gum-resins in the proportion of from equal parts of pyroxyline and resin to one part of pyroxyline to three parts of resin, substantially as and for the purpose set forth.

2. A varnish adapted to produce a tough, elastic, and cohesive film when used as a finishing-varnish in conjunction with other varnishes, consisting of saturated solutions of pyroxyline and resins or gum-resins in suitable solvents in the proportion of equal parts of pyroxyline and resin to one part of pyroxyline to three parts of resin, substantially as and for the purpose set forth.

3. The herein-described spirit-varnish, composed of amyl-acetate, spirits of turpentine, methyl-alcohol, pyroxyline, and shellac combined in about the proportions herein set forth.

In testimony whereof I affix my signature in presence of two witnesses.

WALTER D. FIELD.

Witnesses:
JOSEPH D. GALLAGHER,
CHARLES L. CONOVER.